(No Model.) 2 Sheets—Sheet 1.
H. D. PERKY.
MACHINE FOR THE MANUFACTURE OF FOOD PRODUCTS FROM CEREALS.
No. 520,496. Patented May 29, 1894.
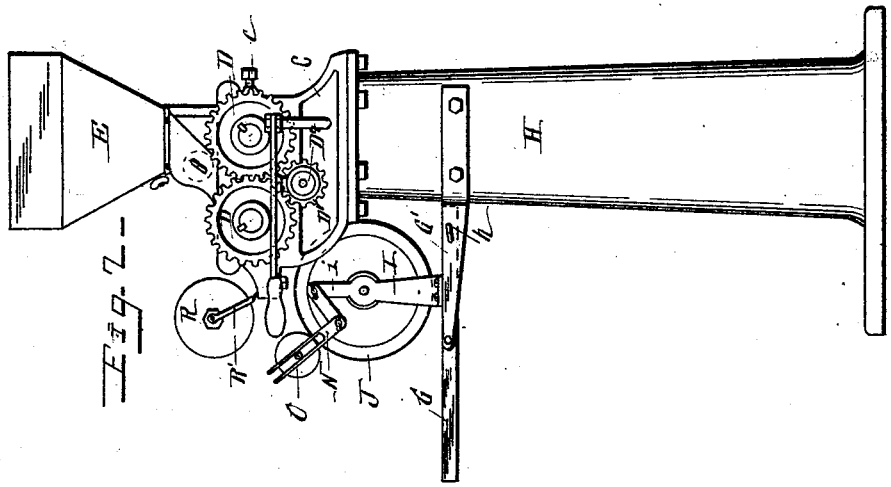
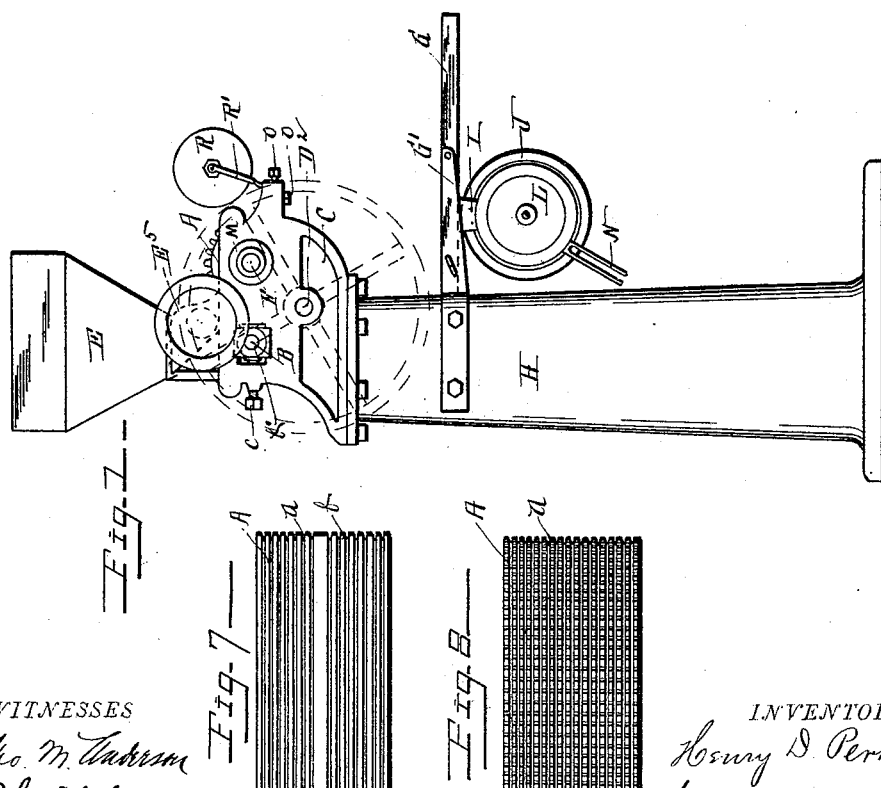
WITNESSES
Geo. M. Tackson
Phil. C. Masi.
INVENTOR
Henry D. Perky
by E. W. Anderson,
his Attorney (No Model.) 2 Sheets—Sheet 2.
H. D. PERKY.
MACHINE FOR THE MANUFACTURE OF FOOD PRODUCTS FROM CEREALS.
No. 520,496. Patented May 29, 1894.
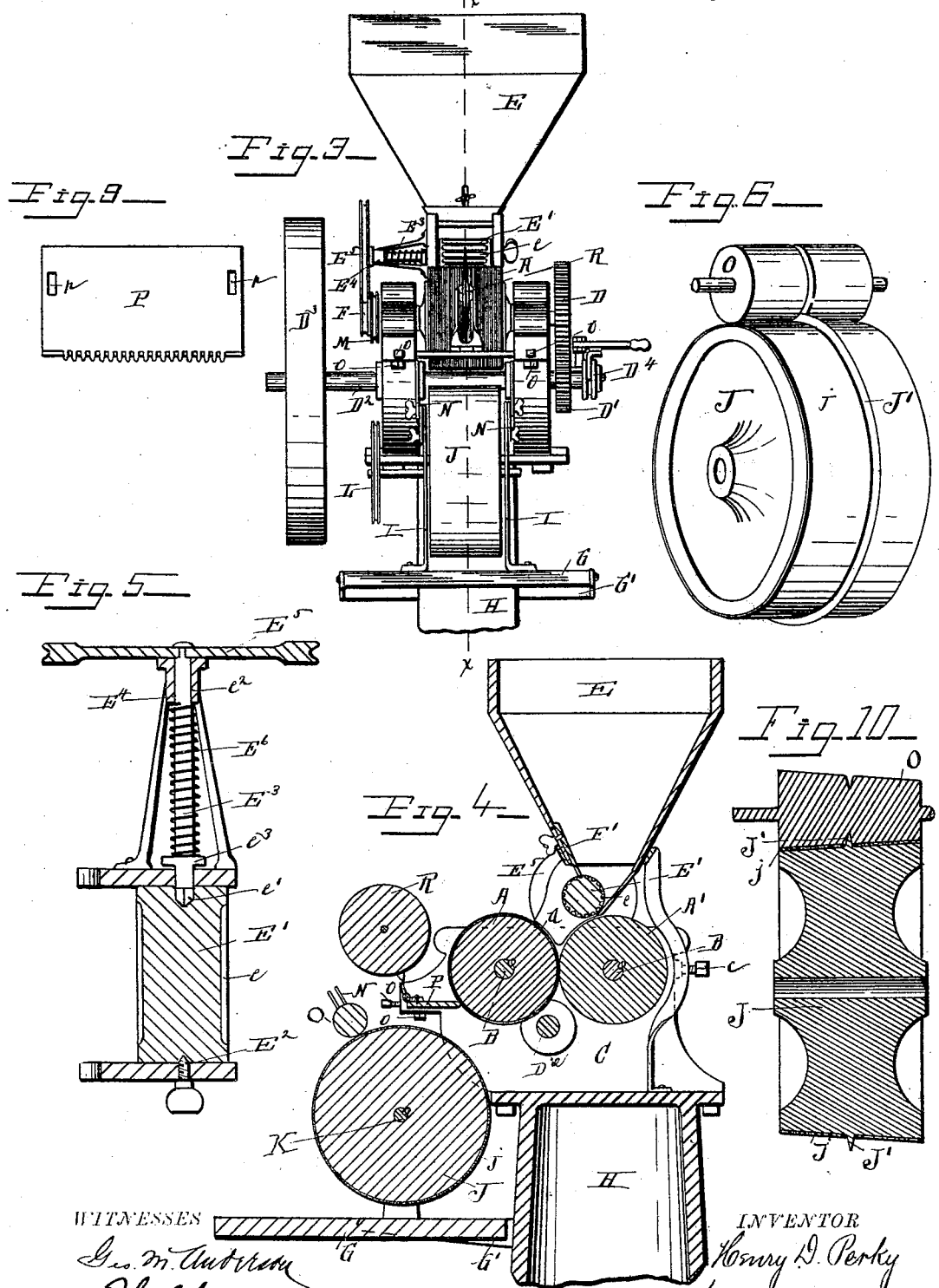
WITNESSES
Geo. M. Anderson
Phil. E. Mair
INVENTOR
Henry D. Perky
by E. W. Anderson
his Attorney

UNITED STATES PATENT OFFICE.

HENRY D. PERKY, OF DENVER, COLORADO, ASSIGNOR TO THE CEREAL MACHINE COMPANY, OF COLORADO.

MACHINE FOR THE MANUFACTURE OF FOOD PRODUCTS FROM CEREALS.

SPECIFICATION forming part of Letters Patent No. 520,496, dated May 29, 1894.

Application filed July 7, 1893. Serial No. 479,849. (No model.)

*To all whom it may concern:*

Be it known that I, HENRY D. PERKY, a citizen of the United States, and a resident of Denver, in the county of Arapahoe and State of Colorado, have invented certain new and useful Improvements in Machines for the Manufacture of Food Products from Cereals; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation of the machine. Fig. 2 is a side elevation of the other side of the machine. Fig. 3 is a front elevation of the machine, with the pedestal broken away. Fig. 4 is a vertical section on the line $x$—$x$, Fig. 3. Fig. 5 is a detail, partly in section, showing the feed roll and its bearings. Figs. 6, 7 and 8 are detail views of modified forms of parts of the invention, and Fig. 9 is a detail view of the comb or scraper. Fig. 10 is a longitudinal vertical section through the rolls O and J.

This invention has relation to certain new and useful improvements in machines for the manufacture of food products from cereals, and it consists in the novel construction and combination of parts, all as hereinafter described and pointed out in the appended claims.

The object of the invention is to provide a practical and efficient machine for the treatment of cereals whereby they may be economically converted into a wholesome food product in desirable and convenient form, as more fully described in my pending application, Serial No. 475,540, filed May 25, 1893.

Referring to the accompanying drawings illustrating the invention, the letters A, A' designate a pair of parallel rolls or cylinders having their shafts B journaled in suitable bearings in a frame C, side by side in close relation to each other, and acting by compression. One or both of said rolls have their surfaces provided with a series of fine circumferential grooves $a$, separated from each other by plain circumferential spaces $b$. In the drawings I have shown only one of the rolls A as having such grooves, the other having a plain cylindrical surface. The shaft of the roll A' is provided with movable bearings $b'$, acted upon by screws $c$, for purposes of adjustment to regulate the compression of the rolls one against the other.

D D are intermeshing gear wheels on the shafts B B, and driven by a pinion D' on a shaft $D^2$, journaled below the shafts B B, and driven by a pulley $D^3$, or by other suitable gear. The shaft $D^2$ is journaled a little to one side of a central line of the shafts B, D, and meshes with one of the gear wheels D.

$D^4$ is a clutch for throwing the pinion D' into and out of driving engagement with its shaft.

E designates a hopper supported over the rolls A, A', and E' is a feed cylinder journaled in the throat or discharge of said hopper. This feed cylinder is formed with longitudinal corrugations $e$, and is made removable from its bearings for purposes of cleaning when necessary. To permit such removal one end of the cylinder has a bearing on a screw point $E^2$, while at the other end is a shaft $E^3$ having a squared portion $e'$ which removably engages a correspondingly shaped socket in the end of the cylinder. Said shaft $E^3$ has a bearing at $e^2$ in a bracket $E^4$, and carries a grooved pulley $E^5$ by means of which it, together with the cylinder is rotated. On said shaft is a collar $e^3$ between which, and the bearing $e^2$, around the shaft, is a spring $E^6$ which normally holds said shaft against endwise movement out of engagement with the cylinder. The shaft may however be withdrawn when it is desired to remove the cylinder, which by this arrangement may be readily accomplished. The pulley $E^5$ may be driven by a belt from a pulley F on one of the shafts B, as shown, or by friction or other gear connection with such shaft. The corrugations $e$ in the feed cylinder E' assist the feed in that they carry the grain from the hopper and cause it to be deposited centrally between the rolls A, A'.

F' is a slide situated in the throat of the hopper E, and arranged to control the feed.

G is a table situated below and in front of the roll A', and supported by a bracket G' carried by the post or support H of the machine. This table is pivotally swung between the arms of said bracket, being reversible, and is normally held in its horizontal position by means of a thumb screw h, or pin engaging the table through the arm of the bracket. Depending from the under side of said table when the latter is in the position shown in Fig. 1, is a bracket I in which is journaled a roll J, which is usually provided with a covering j of canvas, or other suitable material. On the shaft K of said roll is a pulley L, which when the table is in its reversed position, as shown in Fig. 2 is in position to be driven by a belt or other connection with a pulley M on one of the shafts B. Extending from the arms i of the bracket I are slotted or forked arms N, N, the slots of which are designed to form bearings for a removable spindle or former roll O.

P designates a comb or scraper supported on the frame in front, and so situated that its teeth are adapted to engage the fine grooves a of the roll A while the intervening spaces between the teeth travel upon the plain spaces b between said grooves. The bolts which secure the comb to the frame extend through slots p in the comb frame, thereby permitting the comb to be adjusted toward or away from roll A, by means of adjusting screws o.

The operation of the machine as thus far described is as follows:—The grain being first boiled, steamed, soaked, or steeped, and the outer hull or shell being first removed, when desired, it is fed into the hopper E and is delivered by the rolls A, A', which are geared to rotate toward each other. By the compression of these rolls the grains or cereals are reduced and forced into the grooves a of the roll A, from which the resulting product is removed by the comb P in the form of films, strings, or shreds, of light, tender, and porous character, as more fully described in my application before referred to. In the position of the table as shown in Fig. 1, these films, strings, or shreds, are deposited thereon, or into a suitable receptacle supported thereon for the purpose. When, however, it is desired to turn out the finished product in rolls, cups, or other similar forms, the table is reversed and swung into the position shown in Fig. 2 and the roll J is connected with its driving pulley or gear. The shreds, strings, or films, fall upon this roll from the comb, the rotation of the said roll also causing, by friction, the rotation of the spindle or former roll O, which catches such shreds, strings or films and winds them thereon into a cylindrical mass. In order to facilitate the removal of this mass from the former roll or spindle, the latter is preferably made slightly tapering or conical, the roll J being of similar form.

In some cases it may be desired to divide the mass transversely of its length into two parts, and this may be accomplished by means of a cutter R carried by an arm R' pivoted to the front portion of the frame, and adapted to be turned down into cutting contact with the mass as it forms on the roll or spindle O. The same effect may be accomplished by forming the roll J with a central, circumferential cutter projection J', as shown in Fig. 6, or by omitting a few of the grooves a at the central portion of the roll A, as in Fig. 7, so that the product is naturally delivered in two parts.

When both rolls A and A' are provided with the grooves each roll is designed to have a comb and delivery and forming devices, the arrangement being a duplication of that shown.

In some instances in addition to the circumferential grooves a, I may provide the rolls with grooves at right angles to the grooves a, or obliquely thereto, as shown in Fig. 8. This aids the feed and adds to the capacity of the rolls.

Having thus described my invention, what I believe to be new, and desire to secure by Letters Patent, is—

1. In a machine for treating cereals, the combination with the hopper and the compression rolls, of the removable rotary feed cylinder in the throat of said hopper, and above said rolls, a screw forming a bearing for one end of said cylinder, the shaft detachably engaging an angular socket in the opposite end portion of the cylinder, the bearing for said shaft, the spring, and means for driving said shaft and thereby said cylinder, substantially as specified.

2. In a machine for treating cereals, the combination with the compression rolls, and the comb or scraper, of the reversible table, the bracket secured thereto, the roll journaled in said bracket, the former roll or spindle also carried by said bracket, and means for rotating said roll, substantially as specified.

3. In a machine for treating cereals, the combination of the compression rolls, the comb or scraper, the reversible table, the bracket carried thereby and having the forked or slotted arms, the receiving roll journaled in said bracket, the former roll or spindle removably journaled in said forked or slotted arms, and designed to be rotated by frictional contact with said receiving roll, and means for rotating said feeding roll, substantially as specified.

4. In a machine for treating cereals, the combination of the compression rolls, the comb, the receiving roll, the former roll or spindle, and means for dividing the product taken by said former roll into two parts, substantially as specified.

In testimony whereof I affix my signature in presence of two witnesses.

HENRY D. PERKY.

Witnesses:
JOHN S. PERKY,
THOS. H. HARDCASTLE.